(12) United States Patent
Liu et al.

(10) Patent No.: US 12,435,162 B2
(45) Date of Patent: Oct. 7, 2025

(54) PREPARATION METHOD FOR ACETYLATED SODIUM HYALURONATE

(71) Applicant: SHANDONG FOCUSFREDA BIOTECH CO., LTD, Shandong (CN)

(72) Inventors: Lei Liu, Shandong (CN); Chunxi Wang, Shandong (CN); Qing Li, Shandong (CN); Chuanli Kang, Shandong (CN); Jingjing Sun, Shandong (CN); Liwei Tang, Shandong (CN); Qiang Liu, Shandong (CN); Shaojie Lian, Shandong (CN); Meixia Zhang, Shandong (CN); Mengyi Zhang, Shandong (CN); Ququan Li, Shandong (CN); Shuai Du, Shandong (CN)

(73) Assignee: SHANDONG FOCUSFREDA BIOTECH CO., LTD, Shandong (CN)

( * ) Notice: Subject to any disclaimer, the term of this patent is extended or adjusted under 35 U.S.C. 154(b) by 550 days.

(21) Appl. No.: 17/918,906

(22) PCT Filed: Feb. 28, 2022

(86) PCT No.: PCT/CN2022/078460
§ 371 (c)(1),
(2) Date: Oct. 14, 2022

(87) PCT Pub. No.: WO2022/222607
PCT Pub. Date: Oct. 27, 2022

(65) Prior Publication Data
US 2023/0295351 A1    Sep. 21, 2023

(30) Foreign Application Priority Data
Apr. 21, 2021  (CN) .......................... 202110427110.6

(51) Int. Cl.
*C08B 37/08*    (2006.01)
(52) U.S. Cl.
CPC ................................ *C08B 37/0072* (2013.01)
(58) Field of Classification Search
CPC ........................... C08B 37/0075; C08B 7/0072
See application file for complete search history.

(56) References Cited

U.S. PATENT DOCUMENTS

| | | | | |
|---|---|---|---|---|
| 2,170,002 | A * | 8/1939 | Benson | ................. C07C 51/235 562/889 |
| 4,288,592 | A * | 9/1981 | Rauhut | ................ C07D 213/76 562/556 |
| 5,679,657 | A | 10/1997 | Oka et al. | |
| 8,247,546 | B2 * | 8/2012 | Stucchi | ................. C08B 37/006 536/52 |

FOREIGN PATENT DOCUMENTS

| | | |
|---|---|---|
| CN | 109206537 | 1/2019 |
| CN | 109232770 | 1/2019 |
| CN | 110724171 | 1/2020 |
| CN | 110981991 | 4/2020 |
| CN | 113121721 | 7/2021 |
| IN | 110467691 | 11/2019 |
| JP | H0853501 | 2/1996 |

OTHER PUBLICATIONS

Saturnino, BioMed Research International vol. 2014, Article ID 921549, pp. 1-7. (Year: 2014).*
"International Search Report (Form PCT/ISA/210) of PCT/CN2022/078460", mailed on May 7, 2020, pp. 1-4.

* cited by examiner

*Primary Examiner* — Layla D Berry
(74) *Attorney, Agent, or Firm* — JCIPRNET

(57) ABSTRACT

The present invention relates to a preparation method for acetylated sodium hyaluronate, which pertains to the field of organic chemical synthesis, characterized in that, the preparation method includes the following steps: in the protective atmosphere of inert gas, subjecting a hyaluronate and an acetic anhydride to a catalytic reaction in an organic solvent with a catalyst added, adding a water absorbent during the reaction, obtaining a reaction liquid, subjecting a reaction liquid to post treatment, separation, purification, and drying to obtain a product. A too high or too low degree of substitution is effectively avoided in the present invention, so as to obtain a product with a degree of substitution of acetyl groups ranging from 2.7 to 3.2, with mild reactive materials and reacting conditions, and simple separation and purification steps.

6 Claims, No Drawings

PREPARATION METHOD FOR ACETYLATED SODIUM HYALURONATE

This is a 371 application of the International PCT application serial no. PCT/CN2022/078460, filed on Feb. 28, 2022, which claims the priority benefits of China Application No. 202110427110.6, filed on Apr. 21, 2021. The entirety of each of the above-mentioned patent applications is hereby incorporated by reference herein and made a part of this specification.

BACKGROUND

Technical Field

The present invention relates to the technical field of organic chemical synthesis, and specifically to a preparation method for acetylated sodium hyaluronate.

Description of Related Art

Acetylated sodium hyaluronate is a hydrating material obtained by subjecting sodium hyaluronate to acetylation. Hydrogens on the hydroxyl group of sodium hyaluronate are partly substituted by acetyl groups, maintaining its hydrophilicity and meanwhile improving its lipophilicity, which is conducive to improving the affinity and adsorption performance to skin. By providing fresh and non-sticky feeling, acetylated sodium hyaluronate can provide an excellent hydrating effect, repair the skin barrier, and improve the skin elasticity and keep skin smooth. From the view of the structure of acetylated sodium hyaluronate, there are four hydroxyl hydrogens on each disaccharide unit that can be substituted by acetyl groups. Therefore, with respect to one disaccharide structure, the degree of substitution ranges from 0 to 4, and the degree of substitution will affect the hydrophilicity and lipophilicity of sodium hyaluronate. The purpose of acetylation modification is to improve the lipophilicity while maintaining the hydrophilicity of sodium hyaluronate. Therefore, the most suitable degree of substitution is to balance the hydrophilicity and lipophilicity of sodium hyaluronate. The results of research show that when the degree of substitution of acetyl groups ranges from 2.6 to 3.6, and the hydrophilicity and lipophilicity of acetylated sodium hyaluronate are the best.

Among the preparation methods for acetylated sodium hyaluronate in the states of art, one is to prepare by using acetic acid/acetic anhydride as a solvent and catalyzing with concentrated sulfuric acid. However, the use of concentrated sulfuric acid as catalyst is highly dangerous, and ethanol is required to precipitate the product in subsequent steps. Acetylated sodium hyaluronate has higher solubility in ethanol than the ordinary sodium hyaluronate, and thus more absolute ethanol is required to precipitate the product resulting in large consumption.

The other method is to prepare by using DMF as a solvent and acetyl chloride as an acylating agent. The acetylated sodium hyaluronate and preparation method is disclosed by the CN patent publication with the application No. 2019110154812. In the protective atmosphere, a reaction of sodium hyaluronate and acetyl chloride was carried out in the organic solvent to obtain a product which was then subjected to separation and purification, and subsequently reacted with an alkali to obtain a final product. Corrosive catalysts, or pyridine catalysts that are difficult to purify, are not required in this process. However, the following problems still exist: the corrosion of acetyl chloride is relatively strong which would readily make the equipment wear during production and result in that the contents of iron and chromium in the product exceed the standard. The pH needs to be adjusted to 12 during the post treatment of the process, while the ester groups would be readily hydrolyzed in the alkaline environment leading to reduced degree of substitution of acetyl, and depigmentation by using peroxides would also bring great safety hazard.

SUMMARY

The technical problem to be solved by the present invention lies in that, aiming at the deficiencies of the prior art, a preparation method for acetylated sodium hyaluronate is provided wherein a too high or too low degree of substitution is effectively avoided so as to obtain a product with a degree of substitution of acetyl groups ranging from 2.7 to 3.2, with mild reactive materials and reacting conditions, and simple separation and purification steps.

The technical solution of the present invention which solves the above technical problem is as follows: a preparation method for acetylated sodium hyaluronate, characterized in that, the preparation method includes the following steps:

In the protective atmosphere of inert gas, subjecting a hyaluronate and an acetic anhydride to a catalytic reaction in an organic solvent with a catalyst added, adding a water absorbent during the reaction, obtaining a reaction liquid, subjecting a reaction liquid to post treatment, separation, purification, and drying to obtain a product, wherein the product is determined by a hydroxylamine colorimetric method to have a degree of substitution of acetyl groups ranging from 2.7 to 3.2.

Further, reaction of the hyaluronate and the acetic anhydride is as follows: dissolving the hyaluronate in the organic solvent until a homogeneous phase is formed, adding the water absorbent, decreasing a temperature of the reaction system to 10° C.--5° C., dropwise adding the acetic anhydride to the reaction system, then dropwise adding a DMAP-toluene solution to the reaction system, after reacting for a certain time, heating the reaction system to 40° C.-70° C. for reacting for a certain time, and obtaining a faint yellow turbid liquid.

Temperature needs to be decreased when dropwise adding the acetic anhydride, since a partial concentration of acetic anhydride going too high would result in rapid reaction, while the partial heat release would intensify such phenomenon, thereby generating a precipitate in floccule form with a too high degree of substitution. Generally, it can be controlled by severe stirring and dropwise adding, but the effect of magnetic stirring and small-scale mechanical stirring is not so good that temperature needs to be decreased before adding dropwise. After the system is stirred uniformly, the temperature would be increased naturally to normal for reaction.

The reaction formula is as follows:

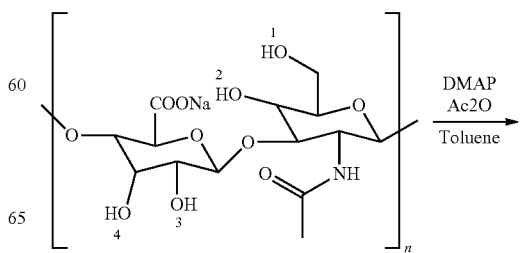

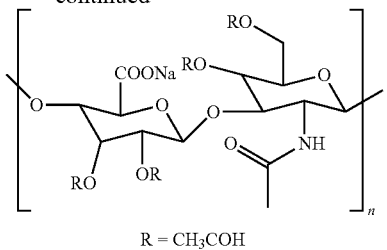

R = CH₃COH

The objective of adding the water absorbent during the reaction is to absorb water contained in the polysaccharide chain as much as possible, so as to avoid that a portion of acetic anhydride is consumed away by reacting with water and thus leading to low degree of substitution.

Further, a mass ratio of the hyaluronate to the acetic anhydride ranges from 1:1 to 1:5, an average molecular weight of the hyaluronate ranges from 5 KDa to 5000 KDa, preferably 10 KDa to 2000 KDa, more preferably 20 KDa to 200 KDa.

Further, after the catalytic reaction is completed, the post treatment to the reaction liquid is as follows: adding water to the reaction liquid to consume the remaining acetic anhydride, and filtering to remove the absorbent.

Further, molecular sieve is used as the absorbent which can be smashed, but not participate in the reaction and be removed by filtration. 4-Dimethylaminopyridine (DMAP) is used as the catalyst, and a mass ratio of the hyaluronate to DMAP ranges from 1:0.05 to 1:0.12.

Further, toluene is used as the organic solvent, a solid-liquid ratio ranges from 1:5 to 1:20.

Further, the separation and purification of the reaction liquid is as follows: subjecting the reaction liquid to membrane filtration for purification, wherein water in small amount is added several times during the purification until a fraction is colorless and smells slightly sour. An organic membrane or ceramic membrane is adopted as the membrane used which is durable to the organic solvents such as toluene, with a pore size of 200 KD to 5000 KD.

Further, after the separation and purification, pH of the reaction liquid is adjusted to 5-7 by an alkali solution, and then concentration is performed. Specifically, at least one of a sodium hydroxide solution, a sodium carbonate solution and a sodium bicarbonate is used as the alkali solution.

Further, low-temperature drying is adopted as the drying, and the temperature is 0-25° C.

The beneficial effects of the present invention lie in that: in the present invention, a water absorbent, molecular sieve, is added during the reaction of hyaluronate and acetic anhydride, and the water absorbent removes the interference of water to the reaction, so as to avoid a relatively low degree of substitution which is resulted by that a portion of acetic anhydride is consumed away by reacting with water first. In the meantime, the reaction temperature is controlled correspondingly for solving the problem of too low or too high degree of substitution. Membrane filtration is adopted for purification, and water in small amount is added several times during the process, so as to remove the catalyst and organic solvent introduced, without the need of a great deal of ethanol for precipitation, and thus consumption is reduced and the obtained product has a high purity and good state. The reaction conditions of the entire process are mild, with simple separation and purification steps.

DESCRIPTION OF THE EMBODIMENTS

Principle and characteristics of the present invention are described in the following, and the examples listed are for illustrating of the present invention only, and are not intended to limit the scope of the present invention.

Example 1

A preparation method for acetylated sodium hyaluronate in the present example included the following steps:
(1) In the protective atmosphere of nitrogen, 50.00 g sodium hyaluronate with a molecular weight of 10 KDa was weighed in a 1000 mL reaction flask, and an anhydrous solvent, 250 mL toluene, was added followed by increasing the temperature to 60° C. with stirring, until they were all dissolved to form a homogeneous phase. Molecular sieve was added for absorbing water in the reaction. Then, the reaction system was cooled to −5° C. 50 mL acetic anhydride was added to the reaction liquid, and then 0.25 g DMAP dissolved in 4 mL toluene solution was dropwise added to the reaction liquid followed by one-hour reaction at room temperature. The reaction was then heated to 40° C. and lasted for 4 hours to obtain a faint yellow turbid liquid.
(2) The same volume of water as the faint yellow turbid liquid was added to remove the remaining acetic anhydride, and then the reaction liquid was filtered to remove the molecular sieve.
(3) The reaction liquid was purified by membrane filtration, water in small amount was added several times during the purification until a fraction was colorless and smelt slightly sour, and the reaction liquid after the last purification had a volume of 200 mL.
(4) The reaction liquid was adjusted by sodium hydroxide to have a pH ranging from 5-7, and then was subjected to concentration.
(5) Drying was performed to obtain 39.01 g acetylated sodium hyaluronate, with a yield of 60%.

The obtained product had a crystalline shape, and was determined by a hydroxylamine colorimetric method to have a degree of substitution of acetyl groups being 2.9, which was within the acceptable range of 2.6-3.6.

Particularly, the yield $\mu=401.3*m_2/m_1*(401.3+(43-1)*DS)$;
wherein m1 represents a mass of the fed sodium hyaluronate, m2 represents a mass of the obtained acetylated sodium hyaluronate, and DS represents the degree of substitution of acetyl groups.

Example 2

A preparation method for acetylated sodium hyaluronate in the present example included the following steps:
(1) In the protective atmosphere of nitrogen, 30.00 g sodium hyaluronate with a molecular weight of 1000 KDa was weighed in a 1000 mL reaction flask, and an anhydrous solvent, 300 mL toluene, was added followed by increasing the temperature to 70° C. with stirring (increasing the temperature was to dissolve the sodium hyaluronate, the greater the molecular weight, the harder the dissolution), until they were all dissolved to form a homogeneous phase. Molecular sieve was added for absorbing water in the reaction. Then, the reaction system was cooled to 0° C. 90 mL acetic anhydride was added to the reaction liquid, and then 0.2 g DMAP dissolved in 4 mL toluene solution was dropwise added to the reaction liquid followed by one-hour reaction at room temperature. The reaction was then heated to 50° C. and lasted for 12 hours to obtain a faint yellow turbid liquid.

(2) The same volume of water as the faint yellow turbid liquid was added to remove the remaining acetic anhydride, and then the reaction liquid was filtered to remove the molecular sieve.

(3) The reaction liquid was purified by membrane filtration, water in small amount was added several times during the purification until a fraction was colorless and smelt slightly sour, and the reaction liquid after the last purification had a volume of approximately 500 mL.

(4) The reaction liquid was adjusted by sodium carbonate to have a pH ranging from 5-7, and then was subjected to concentration.

(5) Drying was performed to obtain 17.5 g acetylated sodium hyaluronate, with a yield of 58%.

The obtained product had a crystalline shape, and was determined by a hydroxylamine colorimetric method to have a degree of substitution of acetyl groups being 2.7, which was within the acceptable range of 2.6-3.6.

Example 3

A preparation method for acetylated sodium hyaluronate in the present example included the following steps:

(1) In the protective atmosphere of nitrogen, 20.00 g sodium hyaluronate with a molecular weight of 200 KDa was weighed in a 1000 mL reaction flask, and an anhydrous solvent, 400 mL toluene, was added followed by increasing the temperature to 70° C. with stirring, until they were all dissolved to form a homogeneous phase. Molecular sieve was added for absorbing water in the reaction. Then, the reaction system was cooled to −5° C. 100 mL acetic anhydride was added to the reaction liquid, and then 0.24 g DMAP dissolved in 4 mL toluene solution was dropwise added to the reaction liquid followed by one-hour reaction at room temperature. The reaction was then heated to 70° C. and lasted for 48 hours to obtain a faint yellow turbid liquid.

(2) The same volume of water as the faint yellow turbid liquid was added to remove the remaining acetic anhydride, and then the reaction liquid was filtered to remove the molecular sieve.

(3) The reaction liquid was purified by membrane filtration, water in small amount was added several times during the purification until a fraction was colorless and smelt slightly sour, and the reaction liquid after the last purification had a volume of 1000 mL.

(4) The reaction liquid was adjusted by sodium bicarbonate to have a pH ranging from 5-7, and then was subjected to concentration.

(5) Drying was performed to obtain 13.8 g acetylated sodium hyaluronate, with a yield of 52%.

The obtained product had a crystalline shape, and was determined by a hydroxylamine colorimetric method to have a degree of substitution of acetyl groups being 3.17, which was within the acceptable range of 2.6-3.6.

Comparative Example 1

The preparation method was the same as that in Example 1. The difference lies in that water absorbent was not added in the process, and a degree of substitution for acetylated HA was 2.21.

The results show that acylation reaction occurred during the reaction process with relatively low degree of substitution. The reason is that sodium hyaluronate has a relatively strong moisture-retaining ability, and the water therein cannot be completely removed without destroying its structure. Sodium hyaluronate in normal cosmetic grade has a loss on drying ranging from 6% to 9%. Acetic anhydride would be subjected to the hydrolysis reaction with the water brought in the reaction system by sodium hyaluronate, thus generating acetic acid and consuming a portion of acetic anhydride. Such acylation reaction is a reversible esterification reaction wherein hydrogens on the hydroxyl group is acylated and substituted. The water in the reaction system would facilitate a reverse reaction in later period, thus affecting the degree of substitution.

Comparative Example 2

The preparation method was the same as that in Example 1. The difference lies in that water absorbent was replaced by concentrated sulfuric acid, and the result is that the water absorbent had a rather great effect on the pH value of the reaction system and even participated the reaction directly.

Comparative Example 3

The preparation method was the same as that in Example 1. The difference lies in that water absorbent was replaced by soda lime, and the result is that the water absorbent had a rather great effect on the pH value of the reaction system and even participated the reaction directly.

Comparative Example 4

The preparation method was the same as that in Example 1. The difference lies in that water absorbent was replaced by anhydrous sodium sulfate, and the result is that the anhydrous sodium sulfate became caked mass after absorbing water and thus affecting the stirring.

Comparative Example 5

The preparation method was the same as that in Example 1. The difference lies in that the temperature in step (1) was controlled to room temperature and the other conditions remained the same. The results show that it took a very long time to dissolve the sodium hyaluronate, the reaction system was not cooled when dropwise adding acetic anhydride and floccule was generated at the adding point. Then heat released in the reaction system partially and more floccule was generated at the adding point. Upon collection and determination, the floccule is acetylated sodium hyaluronate having a too high degree of substitution being close to 4. The floccule was no long soluble in water and was not hydrophilic, which was unqualified.

What is claimed is:

1. A preparation method for acetylated sodium hyaluronate, wherein the preparation method comprises the following steps:
   in the protective atmosphere of inert gas, subjecting a hyaluronate and an acetic anhydride to a catalytic reaction in an organic solvent with a catalyst added, adding a water absorbent during the reaction, obtaining a reaction liquid, subjecting a reaction liquid to post treatment, separation, purification, and drying to obtain a product;

wherein reaction of the hyaluronate and the acetic anhydride is as follows: dissolving the hyaluronate in the organic solvent until a homogeneous phase is formed, adding the water absorbent, decreasing a temperature of the reaction system to 10° C.--5° C., dropwise adding the acetic anhydride to the reaction system, then dropwise adding a DMAP-toluene solution to the reaction system, after reacting for a certain time, heating the reaction system to 40° C.-70° C. for reacting for a certain time;

wherein a mass ratio of the hyaluronate to the acetic anhydride ranges from 1:1 to 1:5, an average molecular weight of the hyaluronate ranges from 5 KDa to 5000 KDa;

wherein after the catalytic reaction is finished, the post treatment to the reaction liquid is as follows: adding water to the reaction liquid to remove the remaining acetic anhydride, and then filtering the reaction liquid to remove the water absorbent.

2. The preparation method for acetylated sodium hyaluronate according to claim 1, wherein molecular sieve is used as the water absorbent, 4-dimethylaminopyridine is used as the catalyst.

3. The preparation method for acetylated sodium hyaluronate according to claim 1, wherein toluene is used as the organic solvent, a solid-liquid ratio of the hyaluronate in the organic solvent ranges from 1:5-1:20.

4. The preparation method for acetylated sodium hyaluronate according to claim 1, wherein after the separation and purification, pH of the reaction liquid is adjusted to 5-7 by an alkali solution, and then concentration is performed.

5. The preparation method for acetylated sodium hyaluronate according to claim 4, wherein at least one of a sodium hydroxide solution, a sodium carbonate solution and a sodium bicarbonate solution is used as the alkali solution.

6. The preparation method for acetylated sodium hyaluronate according to claim 1, wherein low-temperature drying is adopted as the drying, and the temperature is 0-25° C.

* * * * *